US007206388B2

(12) United States Patent
Diacakis

(10) Patent No.: US 7,206,388 B2
(45) Date of Patent: Apr. 17, 2007

(54) SYSTEM AND METHOD FOR PROVIDING VOICE-ACTIVATED PRESENCE INFORMATION

(75) Inventor: Athanassios Diacakis, Boulder, CO (US)

(73) Assignee: Openwave Systems Inc., Redwood City, CA (US)

( * ) Notice: Subject to any disclaimer, the term of this patent is extended or adjusted under 35 U.S.C. 154(b) by 205 days.

(21) Appl. No.: 10/388,276

(22) Filed: Mar. 13, 2003

(65) Prior Publication Data

US 2003/0174814 A1 Sep. 18, 2003

Related U.S. Application Data

(60) Provisional application No. 60/365,244, filed on Mar. 18, 2002.

(51) Int. Cl.
*H04M 1/64* (2006.01)
(52) U.S. Cl. .................... 379/88.03; 709/206
(58) Field of Classification Search ............ 379/80, 379/201.02, 201.06, 201.1, 88.03; 709/206, 709/228, 219
See application file for complete search history.

(56) References Cited

U.S. PATENT DOCUMENTS

| 4,313,035 A | 1/1982 | Jordan et al. |
| 4,740,788 A | 4/1988 | Konneker |
| 5,208,756 A | 5/1993 | Song |
| 5,218,367 A | 6/1993 | Sheffer et al. |
| 5,239,577 A | 8/1993 | Bates et al. |
| 5,243,645 A | 9/1993 | Bissell et al. |
| 5,251,248 A | 10/1993 | Tokunaga et al. |
| 5,255,306 A | 10/1993 | Melton et al. |
| 5,315,636 A | 5/1994 | Patel |
| 5,329,578 A | 7/1994 | Brennan et al. |
| 5,428,678 A | 6/1995 | Fitzpatrick et al. |
| 5,436,963 A | 7/1995 | Fitzpatrick et al. |
| 5,436,965 A | 7/1995 | Grossman et al. |
| 5,440,541 A | 8/1995 | Lida et al. |
| 5,440,620 A | 8/1995 | Slusky |
| 5,475,819 A | 12/1995 | Miller et al. |

(Continued)

FOREIGN PATENT DOCUMENTS

DE 19946960 A 4/2001

(Continued)

OTHER PUBLICATIONS

Communication (enclosing European Search Report), dated Jan. 24, 2005, for European Pat. Application. No. 03006012.3, from the European Patent Office.

(Continued)

*Primary Examiner*—Gerald Gauthier
(74) *Attorney, Agent, or Firm*—Townsend and Townsend and Crew LLP

(57) ABSTRACT

Systems and method for providing voice-activated presence information are disclosed. According to one embodiment, the system includes a voice gateway in communication with a presence server. The presence server is for determining presence information of an individual. The voice gateway is for voicing the presence information to a caller after receiving the presence information from the presence server. The voice gateway may also place an outgoing communication to the individual. The presence server may determine whether the individual is present and available on a communication network.

21 Claims, 15 Drawing Sheets

U.S. PATENT DOCUMENTS

| | | | |
|---|---|---|---|
| 5,493,692 | A | 2/1996 | Theimer et al. |
| 5,497,412 | A | 3/1996 | Lannen et al. |
| 5,550,907 | A | 8/1996 | Carlsen |
| 5,577,100 | A | 11/1996 | McGregor et al. |
| 5,577,111 | A | 11/1996 | Lida et al. |
| 5,592,533 | A | 1/1997 | McHenry et al. |
| 5,721,678 | A | 2/1998 | Widl |
| 5,742,905 | A | 4/1998 | Pepe et al. |
| 5,761,277 | A | 6/1998 | Foladare et al. |
| 5,767,788 | A | 6/1998 | Ness |
| 5,774,802 | A | 6/1998 | Tell et al. |
| 5,777,989 | A | 7/1998 | McGarvey |
| 5,787,354 | A | 7/1998 | Gray et al. |
| 5,802,161 | A | 9/1998 | Svoronos et al. |
| 5,819,084 | A | 10/1998 | Shapiro et al. |
| 5,826,039 | A | 10/1998 | Jones |
| 5,862,331 | A | 1/1999 | Herriot |
| 5,872,926 | A | 2/1999 | Levac et al. |
| 5,884,221 | A | 3/1999 | Wortham |
| 5,896,448 | A | 4/1999 | Holt |
| 5,903,845 | A | 5/1999 | Buhrmann et al. |
| 5,905,789 | A | 5/1999 | Will |
| 5,928,325 | A | 7/1999 | Shaughnessy et al. |
| 5,930,702 | A | 7/1999 | Goldman et al. |
| 5,933,788 | A | 8/1999 | Buhmann et al. |
| 5,963,912 | A | 10/1999 | Katz |
| 5,983,265 | A | 11/1999 | Martino, II |
| 5,987,113 | A | 11/1999 | James |
| 5,991,828 | A | 11/1999 | Horie et al. |
| 6,016,512 | A | 1/2000 | Huittema |
| 6,018,737 | A | 1/2000 | Shah et al. |
| 6,023,762 | A | 2/2000 | Dean et al. |
| 6,032,175 | A | 2/2000 | Fletcher et al. |
| 6,047,054 | A | 4/2000 | Bayless et al. |
| 6,058,179 | A | 5/2000 | Shaffer et al. |
| 6,076,093 | A | 6/2000 | Pickering |
| 6,081,705 | A | 6/2000 | Houde et al. |
| 6,097,793 | A | 8/2000 | Jandel |
| 6,104,799 | A | 8/2000 | Jain et al. |
| 6,104,931 | A | 8/2000 | Havins et al. |
| 6,125,176 | A | 9/2000 | Foladare et al. |
| 6,130,938 | A | 10/2000 | Erb |
| 6,134,447 | A | 10/2000 | Havinis et al. |
| 6,138,003 | A | 10/2000 | Kingdon et al. |
| 6,154,776 | A | 11/2000 | Martin |
| 6,157,953 | A | 12/2000 | Chang et al. |
| 6,195,696 | B1 | 2/2001 | Baber et al. |
| 6,212,392 | B1 | 4/2001 | Fitch et al. |
| 6,243,451 | B1 | 6/2001 | Shah et al. |
| 6,243,714 | B1 | 6/2001 | Shapiro et al. |
| 6,256,504 | B1 | 7/2001 | Tell et al. |
| 6,282,427 | B1 | 8/2001 | Larsson et al. |
| 6,301,609 | B1 | 10/2001 | Aravamudan et al. |
| 6,332,158 | B1 | 12/2001 | Risley et al. |
| 6,360,102 | B1 | 3/2002 | Havinis et al. |
| 6,389,457 | B2 | 5/2002 | Lazaridis et al. |
| 6,446,112 | B1 | 9/2002 | Bunney et al. |
| 6,449,344 | B1 | 9/2002 | Goldfinger et al. |
| 6,456,852 | B2 | 9/2002 | Bar et al. |
| 6,463,288 | B1 | 10/2002 | Havinis et al. |
| 6,484,130 | B2 | 11/2002 | Dwyer et al. |
| 6,577,865 | B2 | 6/2003 | Dikmen et al. |
| 6,640,241 | B1 | 10/2003 | Ozzie et al. |
| 6,671,259 | B1 | 12/2003 | He et al. |
| 6,700,967 | B2 * | 3/2004 | Kleinoder et al. ........ 379/201.1 |
| 6,871,224 | B1 | 3/2005 | Chu et al. |
| 6,925,154 | B2 * | 8/2005 | Gao et al. ................ 379/88.03 |
| 2001/0049745 | A1 | 12/2001 | Schoeffler |
| 2001/0054037 | A1 | 12/2001 | Shapiro et al. |
| 2002/0019816 | A1 | 2/2002 | Shafrir et al. |
| 2002/0021307 | A1 | 2/2002 | Glenn et al. |
| 2002/0023159 | A1 | 2/2002 | Vange et al. |
| 2002/0065630 | A1 | 5/2002 | Dwyer et al. |
| 2002/0065828 | A1 | 5/2002 | Goodspeed |
| 2002/0073233 | A1 | 6/2002 | Gross et al. |
| 2002/0076010 | A1 | 6/2002 | Sahai |
| 2002/0078233 | A1 | 6/2002 | Biliris et al. |
| 2002/0083127 | A1 | 6/2002 | Agrawal |
| 2002/0085701 | A1 | 7/2002 | Parsons et at. |
| 2002/0087704 | A1 | 7/2002 | Chesnais et al. |
| 2002/0116336 | A1 | 8/2002 | Diacakis |
| 2002/0116461 | A1 | 8/2002 | Diacakis et al. |
| 2002/0120687 | A1 | 8/2002 | Diacakis et at . |
| 2002/0126701 | A1 | 9/2002 | Requena |
| 2002/0183077 | A1 | 12/2002 | Fomukong |
| 2003/0023690 | A1 * | 1/2003 | Lohtia ........................ 709/206 |
| 2003/0028621 | A1 * | 2/2003 | Furlong et al. ............. 709/219 |
| 2003/0048195 | A1 | 3/2003 | Trossen |
| 2003/0135624 | A1 * | 7/2003 | McKinnon et al. ......... 709/228 |
| 2004/0117443 | A1 | 6/2004 | Barsness |
| 2004/0203879 | A1 | 10/2004 | Gardner et al. |

FOREIGN PATENT DOCUMENTS

| | | |
|---|---|---|
| EP | 0926871 A2 | 6/1999 |
| EP | 1117263 A2 | 7/2000 |
| EP | 1087595 A2 | 3/2001 |
| EP | 1347624 A3 | 3/2005 |
| WO | WO 00/04730 A1 | 1/2000 |
| WO | WO 00/27143 A1 | 5/2000 |
| WO | WO 00/69140 A1 | 10/2000 |
| WO | WO 01/26393 A1 | 4/2001 |
| WO | WO 01/33825 A1 | 5/2001 |
| WO | WO 01/35683 A1 | 5/2001 |
| WO | WO 01/52511 A1 | 7/2001 |

OTHER PUBLICATIONS

Bhaskaran, Raman, et al. Universal Inbox: Providing Extensible Personal Mobility and Service Mobility in an Integrated Communication Network, CS Division, EECS Department, U.C. Berkeley, CA 94720, USA.

Rosenberg, et al., SIP for Presence, "Internet Engineering Task Force (Internet Draft)," (Nov. 13, 1998), Bell Laboratories, Columbia University, 18 pgs.

Windows 98 Unleased, Sams Publishing, Paul McFedrles, May 12, 1998, Chapter 31.

HowStuffWorks, How Domain Name Servers Work, Marshall Brain.

"IRC FAQ: Introduction to IRC for people using Windows", May 7, 2000, pp: 1-18, mIRC.com archive.org snapshot.

"mIRC FAQ", May 7, 2000, pp: 1-11, mIRC.com archive.org snapshot.

"AOL Instant Messenger 4.0" May 10, 2000, www.AIM.com archive.org snapshot.

Day, M., et al., "A Model for Presence and Instant Messaging," RFC 2778 Archive Memo, Network Working Group, Feb. 2000, pp. 1-18.

Milewski, A.E. and T.M. Smith, Providing Presence Cues to Telephone Users, *CSCW 2000*, Dec. 2-6, 2000, Philadelphia, PA, pp. 89-96.

* cited by examiner

OFFICE PROFILE

| Communication Media | Address | Important | Normal | Restricted | Blocked |
|---|---|---|---|---|---|
| Home telephone | (412) 555-1234 | No | No | No | No |
| Office telephone | (412) 555-0101 | Yes (preferred) | Yes | No | No |
| Mobile telephone | (412) 555-4567 | Yes | No | No | No |
| Voicemail | (800) 555-mail | Yes | Yes (preferred) | Yes | No |
| Personal e-mail | user@domain.com | Yes | No | No | No |
| Work e-mail | user@company.com | Yes (preferred) | Yes (preferred) | No | No |
| Instant messaging | user@someplace.com | Yes | No | No | No |

Fig. 10

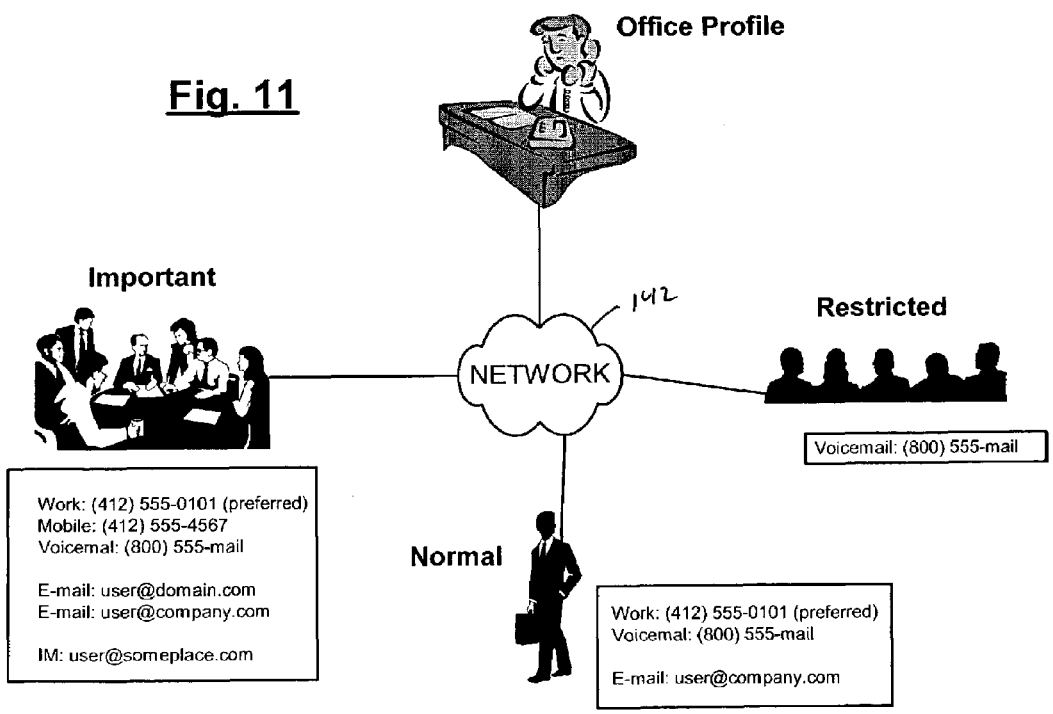

Fig. 11

SYSTEM AND METHOD FOR PROVIDING VOICE-ACTIVATED PRESENCE INFORMATION

CROSS-REFERENCE TO RELATED APPLICATIONS

This application claims priority to U.S. provisional patent application Ser. No. 60/365,244, filed Mar. 18, 2002, which is incorporated herein by reference

BACKGROUND OF THE INVENTION

Certain telecommunications companies presently offer voice-activated contact information services. According to such a service, consider a person (called the user) who wishes to place a telephone call to another person or entity (called the recipient). The user calls a specific directory number that routes the user's call to a voice gateway. The voice gateway responds to the user's incoming call by audibly asking the user to name the intended recipient of the user's call. After receiving the user's response, the voice gateway fetches the user's contact information for the recipient from a server. The server has an associated database that stores the user's contact information. After retrieving the telephone number stored in the database for the recipient, the voice gateway completes the call to the recipient by placing a call to the number stored in the database associated with the recipient. In such a system, however, there is no indication that the recipient is currently accessible by telephone or, even if accessible, whether the recipient wants to receive telephone calls at the moment.

BRIEF SUMMARY OF THE INVENTION

In one general aspect, the present invention is directed to systems and methods for providing voice-activated presence information. According to one embodiment, the system includes a presence server in communication with a voice gateway. The presence server may determine whether a recipient is present on at least one communication network after the voice gateway receives a voice request from a caller to communicate with the recipient. The voice gateway may place an outgoing communication to the recipient in order to bridge a communication between the caller and recipient when it is determined that the recipient is present on the at least one communication network. If the recipient is not present, the voice gateway may place an outgoing communication to a voice mailbox associated with the recipient in order that the caller may leave a voice message for the recipient. According to another embodiment, the voice gateway may voice a message to the caller when the recipient is not present on a communication network, such as to the effect that the recipient in currently unavailable.

According to other embodiments, the system may include one or more of the following features. The communication network may include, for example, a public switched telephone network, a computer network, a wireless communication network, a Short Messaging System (or multimedia messaging system) network and an Instant Messaging network. Where the communication network is a telephone network, the voice gateway may place an outgoing telephone communication to the recipient at the telephone number when the presence server determines the recipient is present on the telephone network.

The presence server may include a presence and availability (P&A) management server. As such, the presence server may determine whether the recipient is present and available on the at least one communication network. In that connection, the presence server may include a presence detection engine for determining whether the recipient is present on a communication network and an availability management engine for determining whether the recipient is available on the communication network.

The voice gateway may be in communication with the presence server via an HTTP server that includes a Common Gateway Interface (CGI) module.

The voice gateway may further be for recording a voice message from the caller for the recipient, converting the voice message to a text file, and delivering the text file to the recipient via a communication network, such as, for example, a Short Messaging System network or an electronic mail network. In addition, the voice gateway may be for recording a voice message from the caller for the recipient and delivering an attachment containing the voice message to the recipient via a communication network, such as, for example, an Instant Messaging network or an electronic mail network.

The presence server may further be for serving contact information regarding the recipient to the voice gateway. In that connection, the voice gateway may further be for voicing the contact information to the caller. The voice gateway may also be configured to place an outgoing communication to the recipient upon receiving a request from the caller in response to voicing the contact information to the caller.

DESCRIPTION OF THE FIGURES

Embodiments of the present invention are described in conjunction with the following figures, wherein:

FIG. 10 is an example of an availability profile according to one embodiment of the present invention;

FIG. 11 is a diagram depicting what information subscribers at various access levels receive according to one embodiment for the profile of FIG. 10;

DESCRIPTION OF THE INVENTION

Figure 1:
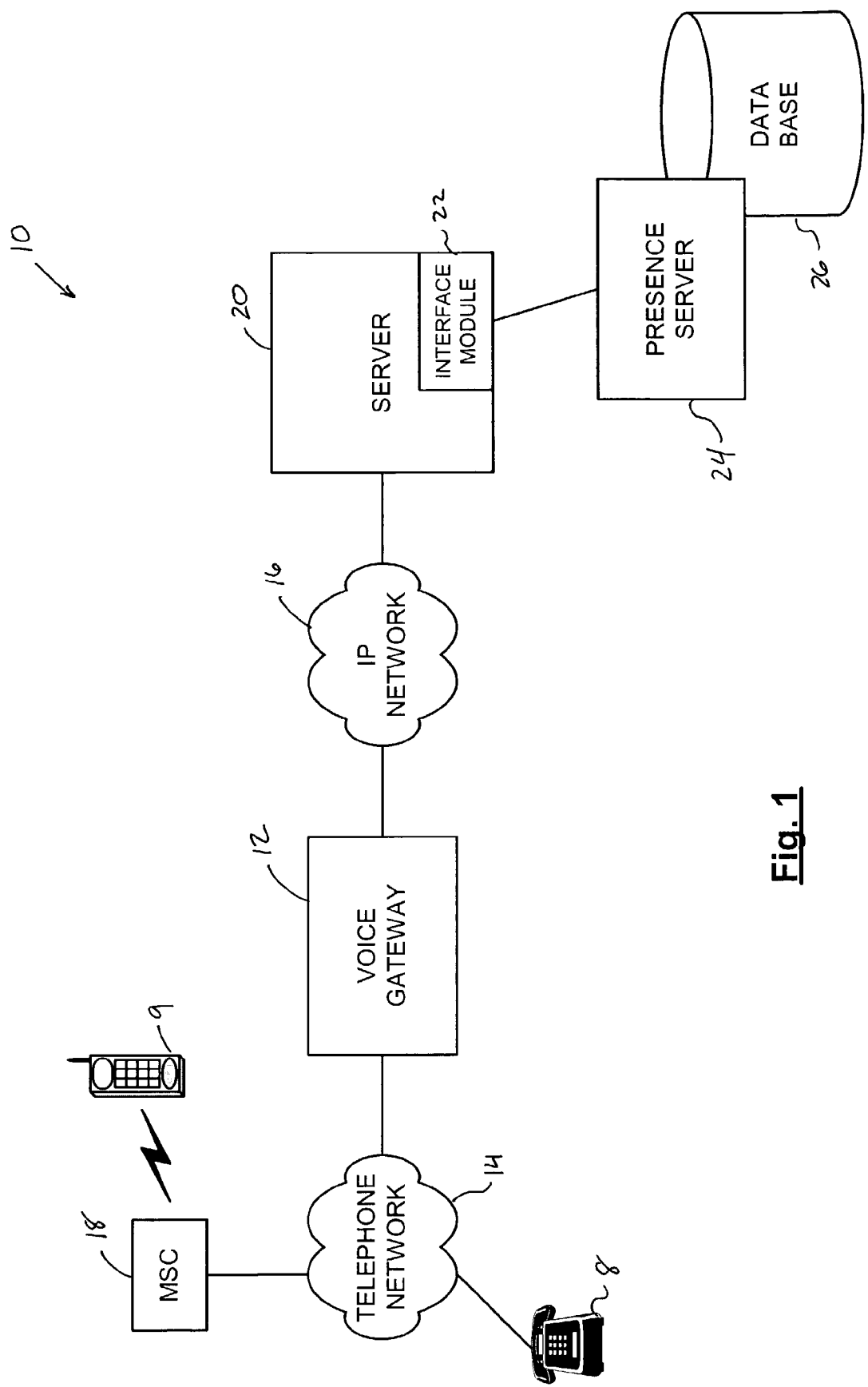
FIG. 1 is a diagram of a system for providing voice-activated presence information according to one embodiment of the present invention.

FIG. 1 is a diagram of a system 10 according to one embodiment of the present invention. A caller may place a telephone communication, such as from the landline telephone 8 or the wireless telephone 9, to the voice gateway 12 by calling a certain directory number associated with the voice gateway 12. The outgoing communication from the caller is routed to the voice gateway 12 by a telephone network 14 such as, for example, a public switched telephone network. Calls from the wireless telephone device 9 may be routed to the PSTN 14 by a mobile switching center 18.

The voice gateway 12 is in communication with a server 20 via, for example, an IP network 16. The voice gateway 12 may bridge the PSTN 14 and the IP network 16 by converting and compressing voice into IP packets, and vice versa. According to one embodiment, the voice gateway 12 may be, for example, a voice XML gateway.

The server 20 may be, for example, an HTTP server and include an interface module 22, such as a Common Gateway Interface (CGI) module, that allows the server 20 to dynamically provide information to the voice gateway 12. For example, the interface module 22 may allow the server 20 to retrieve content from a database (not shown). In addition, as illustrated in FIG. 1, the interface module 22 may allow the server 20 to retrieve presence information from a presence server 24.

The presence server 24 may be any type of server that provides presence information about an individual, firm or organization (hereinafter "individual" or "recipient" for purposes of simplicity) to subscribers of the presence information. According to one embodiment, the presence server 24 may provide presence and availability information (P&A) regarding the individual. One such presence server is described in published U.S. patent application Pub. No. 2002/0116461 A1, which is incorporated herein by reference. Such a server 24 is sometimes referred to as a P&A management server. In the description to follow, the system 10 will be primarily described as including a presence server 24 that provides P&A information (i.e., a P&A management server), although it should be recognized that according to other embodiments a presence server that merely provides presence information, without availability information, may also be used.

"Presence" is defined herein as the ability of the individual to access a particular communications network, such as a telephone network, IM network, computer network, electronic mail network, SMS network, etc. Thus, for example, if the individual is near a landline telephone or a wireless telephone that is switched on, then the individual is "present" on a telephone network. That is, the individual is able to use the telephone network to communicate with other people also on the network. Conversely, if the individual is not near a landline telephone or an activated wireless telephone, then the individual is not present on a telephone network, and thus is unable to communicate with others on the telephone network.

"Availability" is defined herein as the willingness of an individual who is present on one or more communications networks to be reached by one or more persons. Following the telephone network example above, if the individual is near a landline or activated wireless telephone and has the intention or willingness to answer the phone when a particular person calls, the individual is not only present but available on the telephone network. However, if the individual is unwilling or unable to answer the phone when it rings, although present, the individual is not available.

It should be noted that an individual needs to be present on a network in order to be available, yet the opposite is not necessarily true. In addition, presence is absolute. That is, a person is either present or not on a given network. However, availability depends on, e.g., other people, situations, circumstances, personal preferences, etc. For example, an individual can be available to a first group of people, but unavailable to a separate group. That is, an individual may define a set of profiles that provide different subscribers (based on the subscriber's access level, such as important, restricted, normal, etc.) different contact information depending upon the individual's current situation (such as at home, at work, on the road, etc.). These profiles and associated contact information may be stored in an associated database 26 of the presence server 24. Based on the subscriber's access level and the individual's situation, the presence server 24 may retrieve the appropriate contact information of the individual for each subscriber of the individual's information from the database 26.

As described below in conjunction with FIGS. 14 and 15, the presence server 24 may include a feedback mechanism to filter inaccurate P&A information. The feedback mechanism may, for example, monitor the published P&A information from the presence server 24 and, if the information is, for example, inaccurate or unusable, make adjustments to ensure the integrity of the published P&A information. For example, if the published P&A information for an individual indicates that he is present and available on his mobile telephone, but if the last three times someone called the individual on his mobile telephone the individual did not answer, then the feedback mechanism may ensure that the presence server 24 will not longer indicate mobile telephone presence and availability to the appropriate access levels until there is evidence that the individual resumes usage of his mobile telephone. The feedback mechanism may determine whether the individual's P&A information is, for example, inaccurate or unusable based on information received from the appropriate communication networks with which the presence server 24 interfaces.

When the caller calls the voice gateway 12 and asks to call the recipient, the voice gateway 12 may access the server 20 for the recipient's preferred phone number given the recipient's current situation and the caller's access level to the recipient's contact information. The server 20 in turn, via the interface module 22, may retrieve the P&A information (or presence information only for a presence server that does not maintain availability data) from the presence server 24 and return it to the server 20, which forwards it to the voice gateway 12. The voice gateway 12 may then initiate an outgoing call to the recipient at his preferred number and then bridge the incoming call from the caller with the outgoing call to the recipient.

Figure 2:
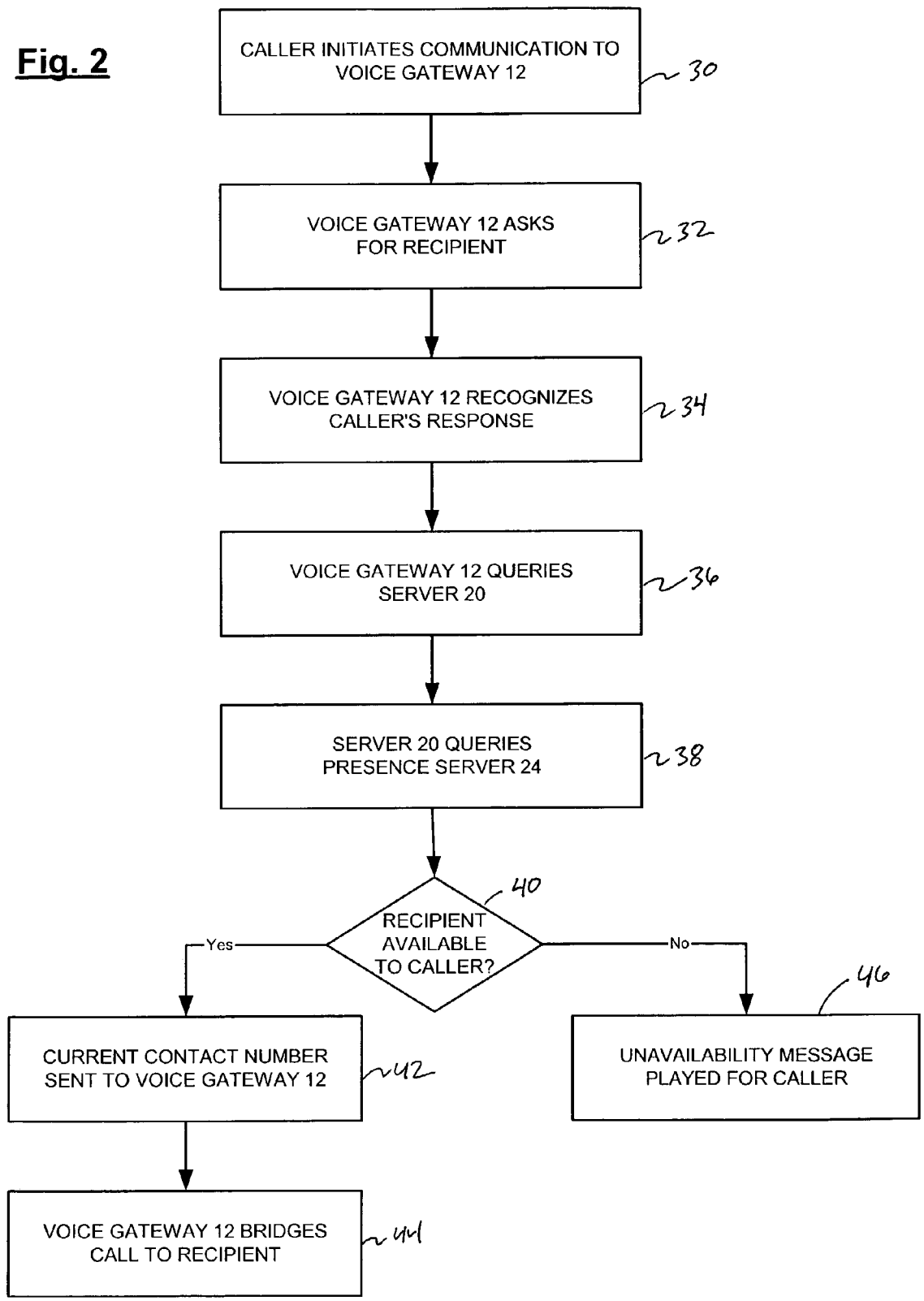
FIG. 2 is a flow chart illustrating a method of providing voice-activated presence information according to one embodiment of the present invention.

FIG. 2 provides an example of how the system 10 may operate according to one embodiment. At block 30, a caller, such as from the landline telephone 8 or the wireless telephone 9, initiates an outgoing call to the voice gateway 12 by dialing a certain directory number associated with the voice gateway 12. The PSTN 14 routes the call to the voice gateway 12 and, upon receipt of the call, at block 32, the voice gateway 12 audibly asks the caller the name of the recipient he wishes to call. At block 34, the voice gateway 12 recognizes the caller's response using, for example, a speech recognition application (not shown). By way of example, assume the recipient's name is George. At block 36, the voice gateway 12 then communicates with the server

20 to get George's currently preferred telephone number for the particular caller (i.e., person who made the call to the voice gateway 12).

At block 38, the server 20 may then query the presence server 24 to retrieve the currently preferred contact information of the recipient (George). As an initial step, at block 40 the presence server 24 determines George's availability to the caller given George's current situation, presence, and the caller's access level. For example, if George is at work and present on his work telephone, and the caller belongs to an access level that is permitted to receive George's work number, the presence server 24, at block 42, returns George's work number to the voice gateway 12 and, at block 44, the voice gateway 12 places an outgoing call to that number. If George is at home and the caller belongs to an access level that is permitted to receive George's home number, the presence server 24 returns George's home number and the voice gateway 12 places an outgoing call to that number. Similarly, if George is present and available at his wireless telephone and the caller belongs to an access group that is permitted to receive George's wireless telephone number, the presence server 24 returns George's wireless number and the voice gateway 12 places an outgoing call to that number. If it is determined, however, at block 40 that George is not present and available on any telephone networks or is not present and available to the caller pursuant to George's current situation and the caller's access level, the voice gateway 12 may instead, for example, at block 46, enunciate an announcement to the caller that George is unavailable at the moment. Alternatively, the voice gateway 12 may route the incoming call to a voice mailbox associated with George.

For an embodiment of the system where the presence server 24 does not determine availability information, the presence server 24 may only determine on which networks the individual is present and this information may be voiced to the caller by the voice gateway 12.

Figure 3:
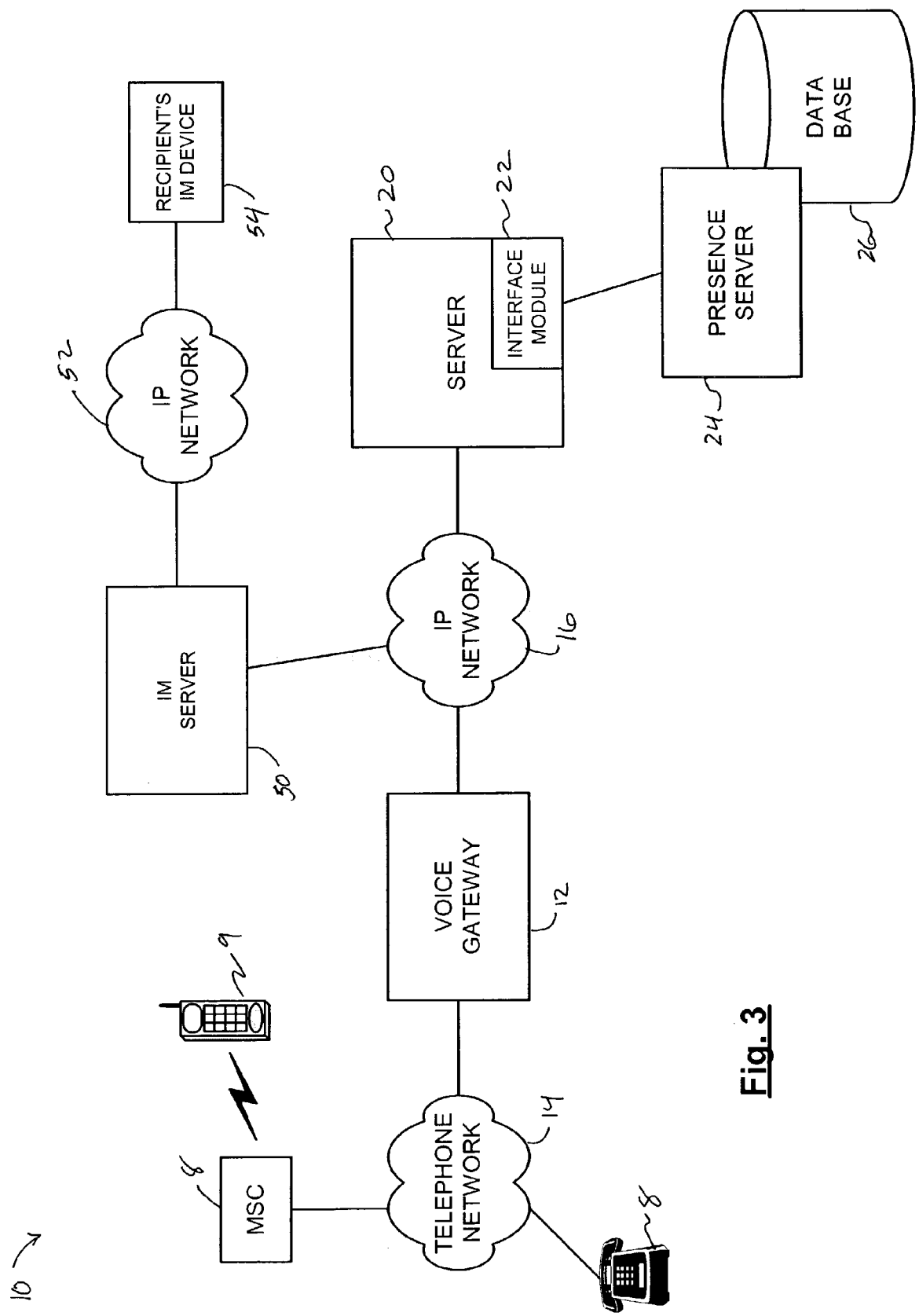
FIGS. 3 and 4 are diagrams of systems according to other embodiments of the present invention.

FIG. 3 is a diagram of the system 10 according to another embodiment of the present invention. For the embodiment illustrated in FIG. 3, the voice gateway 12 may also be in communication with an Instant Messaging (IM) server 50 via the IP network 16 (or another IP network). If George is present and available (or merely present for a presence server 24 that does not determine availability) on the IM network 52, as determined by the presence server 24, the voice gateway 12 may provide the caller with the option of recording a voice message for George that is sent as a voice attachment file to an IM message. The voice gateway 12 may then deliver the voice attachment file to the IM server 50 via the IP network 16, where it may then be delivered to the recipient's (e.g., George's) IM device 54 via the IM network 52. According to another embodiment, if George is present on an electronic mail network, the voice gateway 12 may send the voice file as an attachment in an electronic mail message to George.

Figure 4:
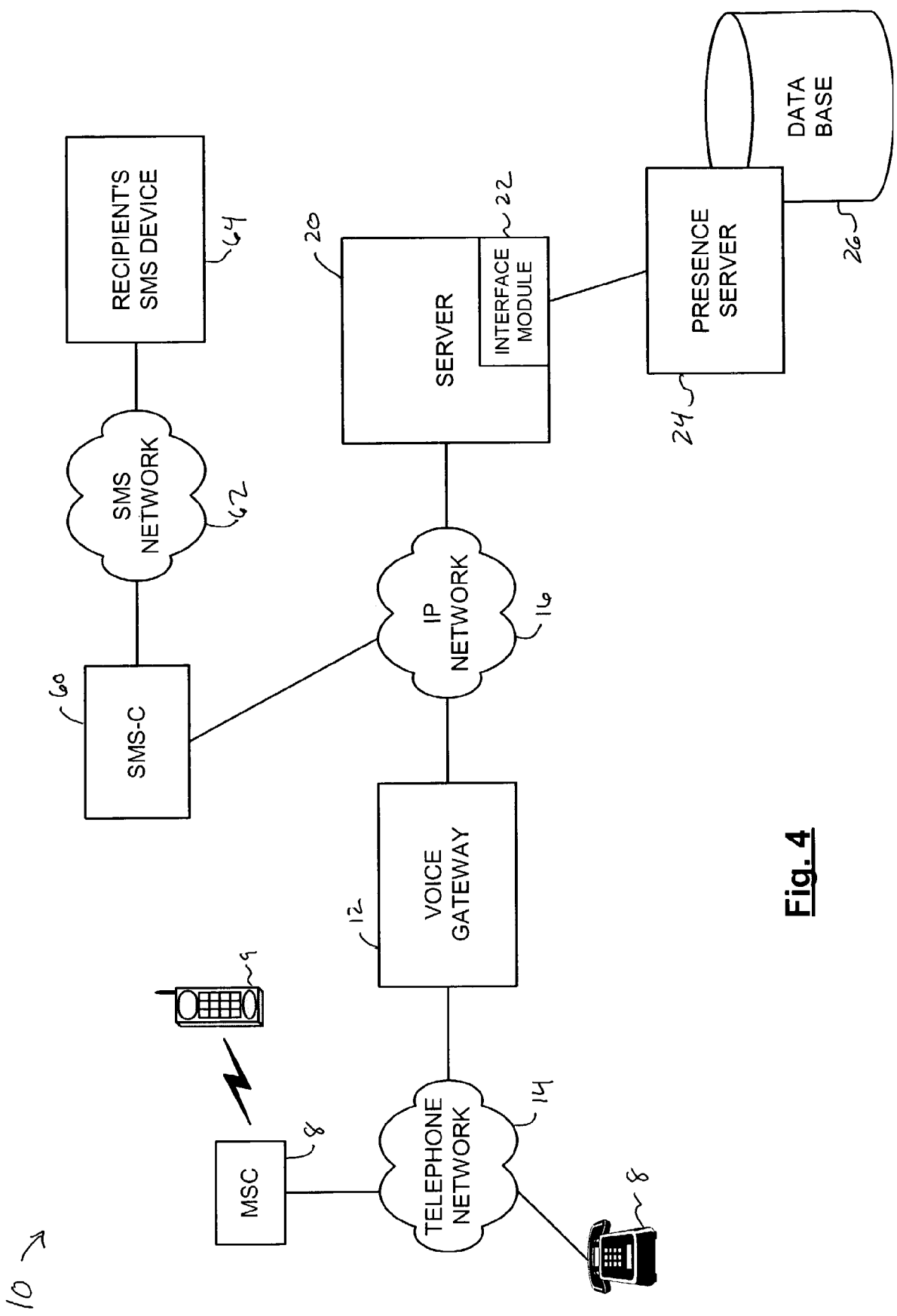

FIG. 4 is a diagram of the system 10 according to another embodiment of the present invention. As illustrated in FIG. 4, the voice gateway 12 may also be in communication with a short messaging service center (SMS-C) 60. Thus, for example, if the intended recipient (e.g., George) is present and available (or merely present for a presence server 24 that does not determine availability) on an SMS network 62, as determined by the presence server 24, the voice gateway 12 may provide the caller with the option of recording a voice message for George that is converted to text by a speech-to-text converter to be sent as an SMS message to George's SMS device 64 via the SMS network 62. According to another embodiment, if George is present on an electronic mail network, the voice gateway 12 may send the text in an electronic mail message to George.

Figure 5:
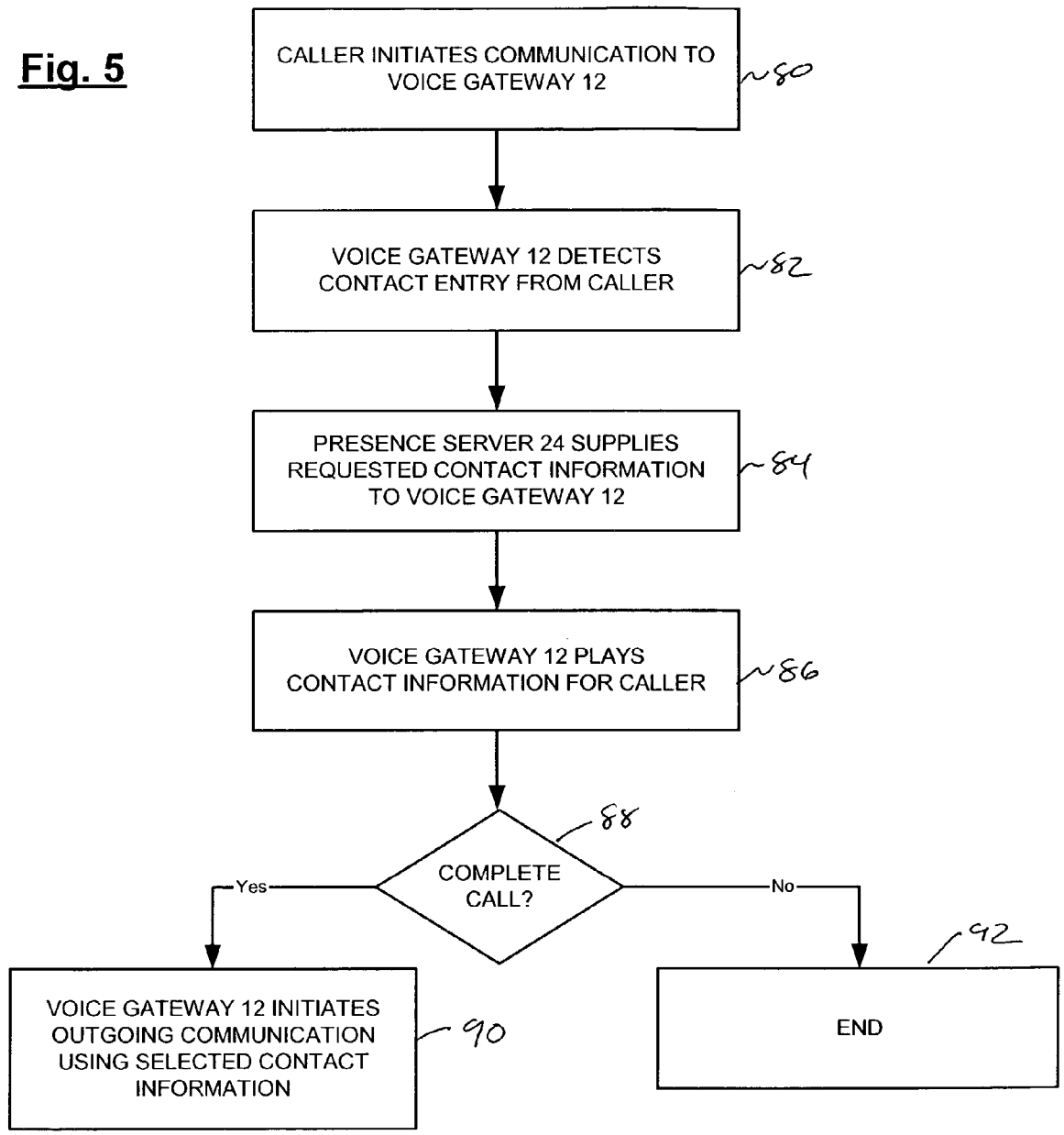
FIGS. 5–8 are flow charts illustrating methods according to embodiments of the present invention.

According to another embodiment, the database 26 (or another database associated with the presence server 24) may store contact information for the caller. For example, the database 26 may store the various phone numbers and other network addresses of individuals in the caller's contact list. For such an embodiment, as illustrated in FIG. 5, at block 80 a caller from one of the telephone devices 8, 9 may initiate a communication (e.g., call) to the voice gateway 12 to recall or modify such contact information from the database 26. At block 82, after prompting by an audible message from the voice gateway 12, the voice gateway 12 may detect the name and requested contact information of the individual on the caller's contact list for which the caller wishes to retrieve contact information. The detection of the contact entry by the voice gateway 12 may be performed, for example, by DTMF detection for an IVR (integrated voice response) system of the voice gateway 12 or by speech recognition system of the voice gateway 12. At block 84, the voice gateway 12 may retrieve the requested contact information from the presence server 24 (and associated database 26) via the server 20, as described previously, and, at block 86, audibly supply the requested contact information to the caller. In addition, at block 88, the voice gateway 12 may also provide the caller with the option of completing the communication to the individual using certain of the retrieved addresses, such as by making a telephone call to the phone number of the individual selected by the caller. If the caller chooses to complete the communication using certain of the requested contact information, the voice gateway 12 at block 90, may then initiate an outgoing communication using the selected contact information. For example, the voice gateway 12 may initiate an outgoing call to the individual using the selected contact information to bridge a call between the caller and the individual. If the caller does not wish to complete the communication, the process may end (block 92).

Figure 6:
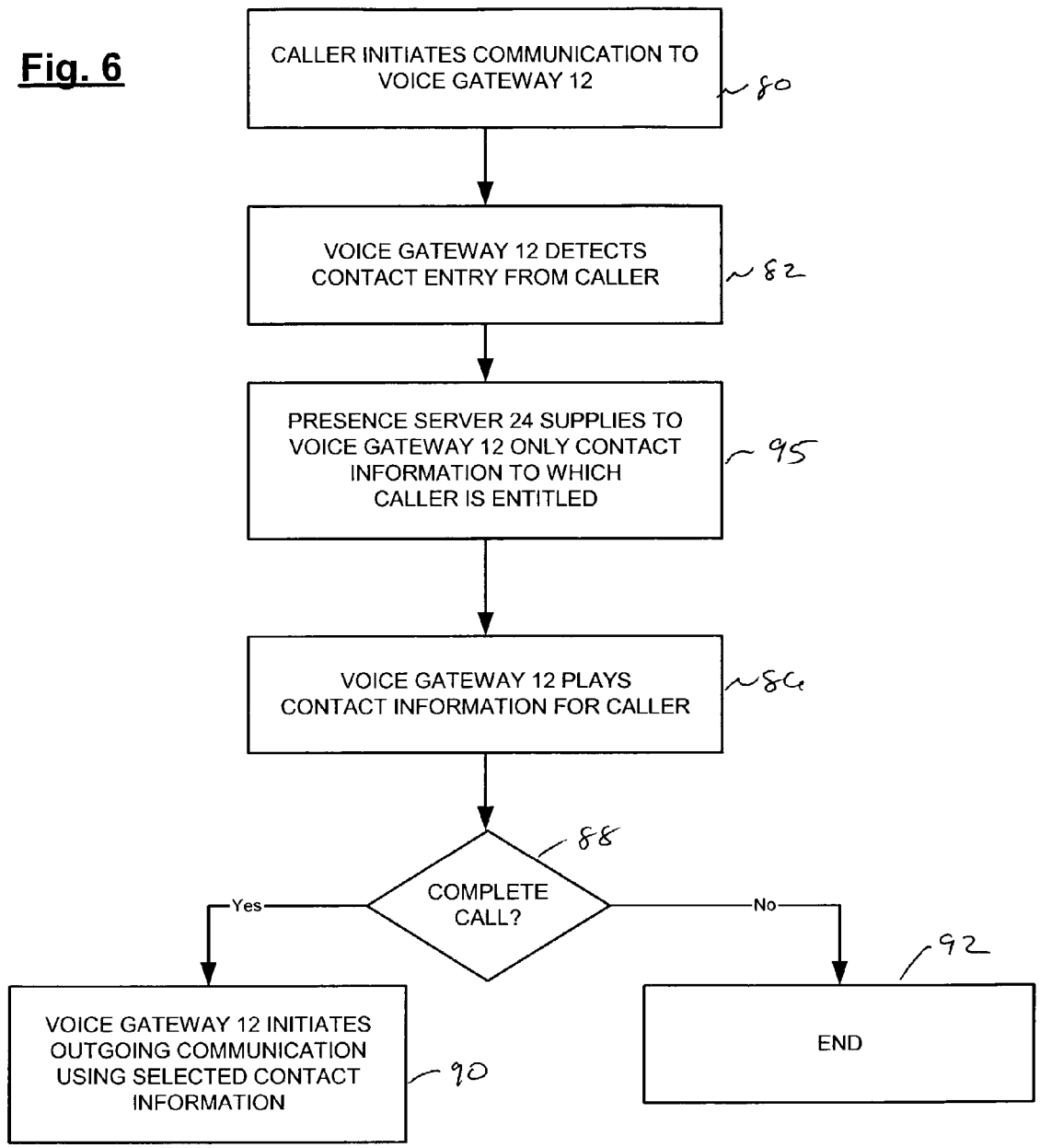

According to another embodiment, the presence server 24 may use the determined P&A information (or presence information only for a presence server 24 that does not maintain availability information) for the individual so that only the contact information relative to the individual's current situation is provided to the caller, given the caller's access level for the individual's current situation. FIG. 6 is a diagram of such a method according to one embodiment of the present invention. The illustrated method is similar to that in FIG. 5, except that at block 100, the presence server 24 only supplies the voice gateway 12 with the contact information to which the caller is entitled based on the presence and availability of the individual for which the contact information is requested, the individual's current situation, and the caller's access level. Subsequent to block 95, the process may proceed as explained previously in conjunction with FIG. 5.

By way of example, assume the caller calls the voice gateway 12 to get George's contact information. Without use of the P&A information such as is the case for the method illustrated in FIG. 5, the voice gateway 12 (in conjunction with the server 20 and the presence server 24) may provide to the caller all of George's phone numbers listed in George's contact profile, such as work number, home number, wireless number, etc. For an embodiment that additionally uses the detected P&A information for George, such as illustrated in FIG. 6, the voice gateway 12 (in conjunction with the presence server 24) may only provide the number for which George is currently present and available to the caller (given the caller's access level), which may be a subset of all the numbers associated with George in the contacts profile. Upon receiving this information, the voice gateway 12 may be further provisioned to allow the caller to initiate a communication to George, as described previously.

Figure 7:
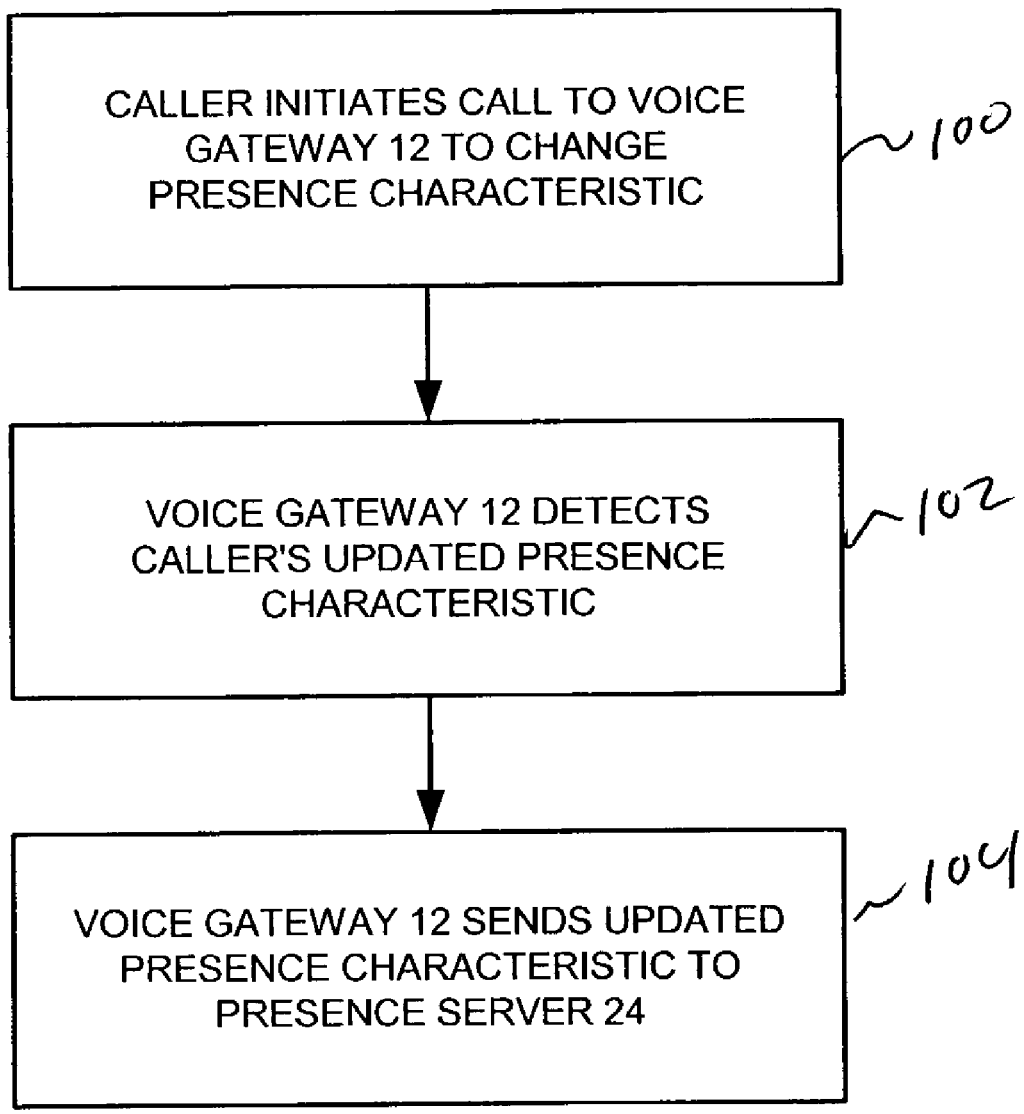

As described previously, the presence server 24 may determine an individual's presence and availability based on a set of profiles stored in the database 26 for the individual. Different profiles may exist for different situations of the individual, such as, for example, at home, at work, on the road, etc. According to another embodiment, the system 10 may allow individuals to change their profile through the voice interface of the voice gateway 12. For example, as illustrated in FIG. 7, an individual may call at block 100 the voice gateway 12 to, for example, change his current profile. That is, for example, the individual may call the voice gateway 12 to instruct the presence server 24 to transition his profile from "at home" to "at work," etc. The voice gateway 12, at block 102, may detect the individual's updated profile instructions (such as by, for example, DTMF detection or speech recognition) and, at block 104, forward the information to the presence server 24 via the server 20. The presence server 24 may then accordingly update the database 26. In addition to current situation, the individual may modify other presence characteristics besides current profile in this manner including, for example, adding or deleting profiles, adding or deleting access levels, changing subscribers on the various access levels, etc.

By storing the profiles with the presence server 24, the individual only needs to send small amounts of information (a voice command or DTMF command, for example, via the voice gateway 12) to the presence server 24 when changing his profile rather than having to send all the presence and availability information associated with the "At Home" situation, which may be considerably larger. By storing the profiles with the presence server 24, the presence server 24 may thus have the necessary information available when individuals switch profiles. Thus, an individual only needs to let the presence server 24 know which situation profile he prefers. Storing the profiles with the presence server 24 additionally reduces the amount of resources required to invoke a profile switch operation. This may be an important feature, particularly when mobile and/or handheld devices are used. This is because conventional mobile and handheld devices, in contrast to conventional computer workstations, may not have the capability to store and process large amounts of information in relatively brief time periods. Furthermore, by reducing the amount of information transmitted, the system 10 avoids slower response times, increased latency and in general improves the caller's services and experience.

Figure 8:
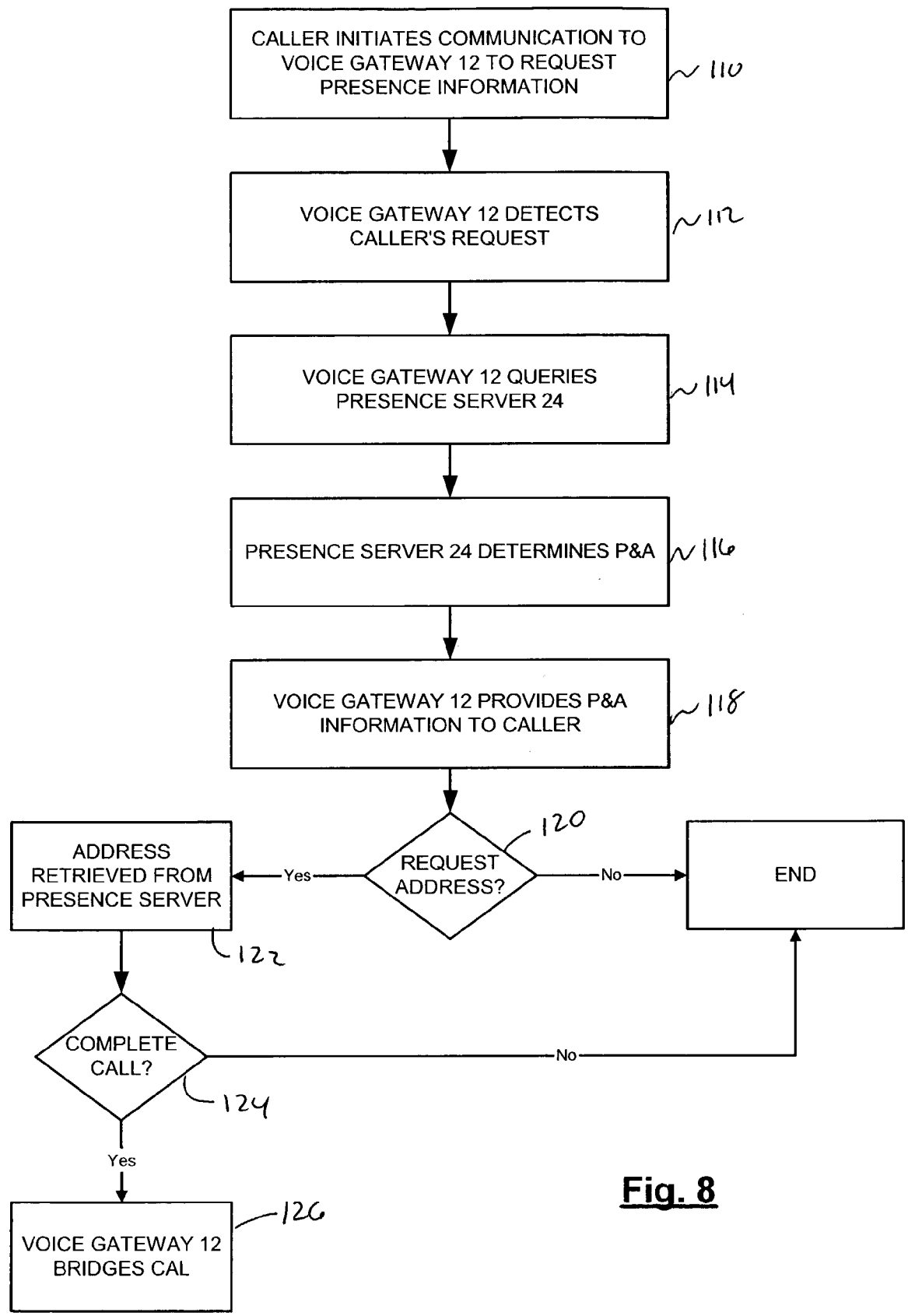

According to another embodiment, the system 10 may provide a caller (e.g., caller of the telephone device 8 or 9) with a summary of the individual's P&A information (or presence information only for a presence server 24 that does not maintain availability data) through the voice interface of the voice gateway 12. Using George as the example again, an embodiment of the process is described with reference to FIG. 8. At block 110, the caller may initiate a call to the voice gateway 12 to request a summary of George's P&A information through the voice interface. The summary information may include, for example, whether George is present and available on certain communication networks such as, for example, a telephone network, an IM network, a facsimile transmission network, a computer network, etc. At block 112, the voice gateway 12, after prompting the caller, detects the name of the individual (e.g., George) for whom the caller wants the presence information. At block 114, the voice gateway 12 queries the presence server 24 and, at block 116, the presence server determines George's P&A information based on, as described previously, George's availability of certain communication networks, George's current profile and the caller's access level. At block 118, the voice gateway 12 provides the networks on which George is present and available to the caller, as determined by the presence server 24. In addition, at block 120, upon hearing the summarized P&A information, the caller may choose to hear the address(es) at which George is present and available for one (or more) of the communication networks. Upon detecting this further request, this information may be retrieved from the presence server 24 and forwarded to the caller through the voice interface of the voice gateway 12 at block 122. In addition, rather than merely hearing the address at which George is available, the caller may, at block 124, wish to initiate a communication to George through a selected communication network. As described previously, the voice gateway 12 may further provide this functionality at block 126.

Figure 9:
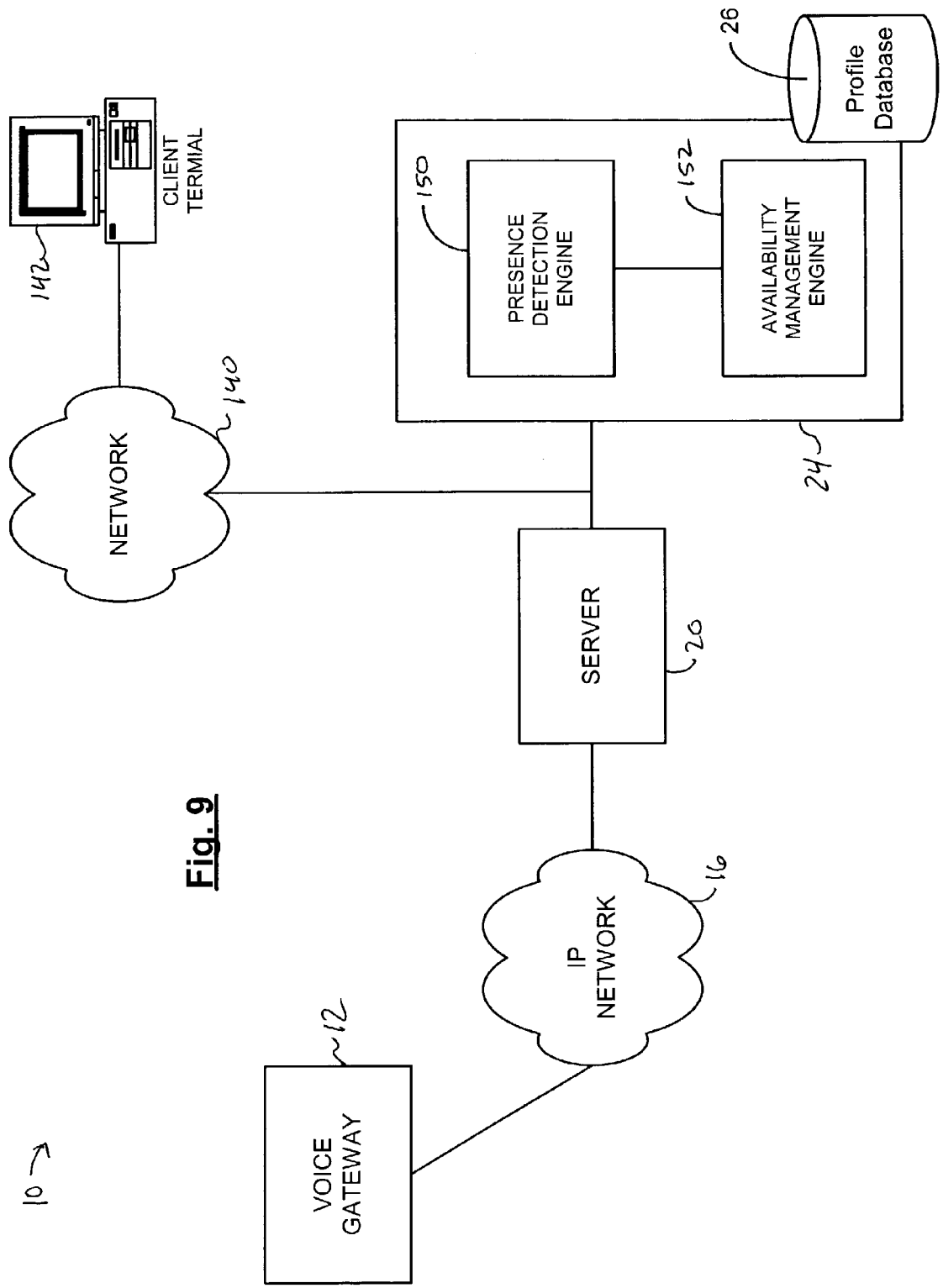
FIG. 9 is a block diagram of the system according to one embodiment of the present invention.

Embodiments of a presence server 24 that provides P&A information (i.e., a PUA management server) are now described in conjunction with FIGS. 9–15. FIG. 9 is a diagram of a system 10 according to one embodiment of the present invention. In FIG. 9, the presence server 24 is shown in communication with a client terminal 142 via a communication network 140. For purposes of simplicity, the telephone network 14, telephone devices 8, 9 and the MSC are not shown in FIG. 9.

The client terminal 142 is sometimes referred to herein as "a client." The presence server 24 may include, as illustrated in FIG. 9, a presence detection engine 150 and an availability management engine 152. Profile information, as described previously, is stored in the database 26. The presence server 24 may be in communication with numerous client terminals 142, although only one is shown in FIG. 9 for purposes of simplicity. The client terminal 142 is illustrated as a personal computer in FIG. 1, although according to other embodiments the client terminal may be another type of communication device such as, for example, a wireless telephone (such as a WAP (Wireless Application Protocol)—enabled phone) or a wireless or connected personal digital assistant (PDA). In addition, as will be apparent from the description to follow, the telephone devices 8, 9 shown in FIG. 1 may also be considered client terminals that are in communication with the presence server 24 via the telephone network 14, the voice gateway 12 and the server 20.

The network 140 may be any connected system of, for example, communication lines, channels, and radio interfaces, used to exchange information between the presence server 24 and the client 142. According to one embodiment, the network 140 may include, for example, the Internet, an intranet, the public switched telephone network (PSTN), or a wireless telephone or radio network. According to one embodiment, the presence server 24 and client 142 may communicate via the network 140 using an open draft TCP/IP based protocol.

According to one embodiment, the system 10 employs a publisher-subscriber model to push P&A information from the presence server 24 to the client 142. According to such an embodiment, an individual defines a P&A profile set, which is stored in the database 26 associated with the presence server 24. When the individual transmits a change in profile to the server 24, the server 24 publishes the change to each of the connected clients that are subscribers of the individual's information. The publisher-subscriber model enables subscribers to observe a particular individual's P&A information instantly.

Hereinafter, a user of the client terminal 142 is typically referred to as "subscriber." Unless noted otherwise, the term "subscriber" is used synonymously with the term "observer." One instance, however, in which an observer is not the same as a subscriber is if someone requests an individual's P&A information just once, without placing a subscription for it. In FIG. 9, the system 10 is illustrated as including only one server 24 and one client 142, although other embodiments of the present invention contemplate a distributed architecture including multiple management servers and multiple clients.

An individual user of the system 10 may initially configure his P&A profile settings in order to instruct the presence server 24 how his information is to be distributed. According to one embodiment, the individual may configure their P&A management profile set according to the following steps. First, the individual is requested to enter information regarding each of the communication devices that the individual uses and a corresponding address for each of those devices. For example, the individual may have a landline telephone with a phone number and a computer workstation with an e-mail address. Second, the individual identifies and categorizes the people to whom he wants his information published. This allows individuals to select the "more important" people and to give them easier access, whereas the "less important" people are given minimum access, and undesirable groups of people are restricted from access altogether. These different group levels may be referred to as "access levels." Third, the individual may define a series of profiles that describe a situation that the individual may be in such as, for example, "at home," "at office," or "on the road." Further, the individual may identify how he wishes to be communicated with for each profile and for each access level. In addition, where several modes of communication over one medium are possible, the individual may identify which mode is preferable.

For example, an individual may have an office profile as indicated in FIG. 10. Thus, a subscriber with an access level of "Important" would receive the items marked "Yes" in the "Important" column, with the preference indicated (where appropriate), thereby making it easy for "important" subscribers to communicate with the individual. Persons in the "Normal" access level would receive less contact information than persons in the "Important" access level for the example shown in FIG. 10, and persons in the "Restricted" access level may receive even less contact information. Persons in the "Blocked" access level would receive no contact information at all. The individual may specify which persons belong to each access level for each profile.

Accordingly, as illustrated in FIG. 11, subscribers in various access groups would have access to different information regarding the individual. Similarly, the individual may define other profiles for different situations such as, for example, "at home," "on the road," "meeting" and "vacation." Collectively, the individual's profile for each of these situations may define a profile set.

As discussed, an individual may configure his profile such that subscribers at certain access levels have access to the individual's P&A information at certain times. For example, the individual may configure his profile such that his boss has access to the individual's P&A while the individual is at work; his wife has access all the time; and his parents have access only on weekends while not at work. Accordingly, when the presence server 24 detects a change in, for example, the individual's situation, the presence server 24 consults the individual's defined rules and preferences (which may be stored in the database 26), and transmits the appropriate information to the clients 142 for subscribers to the individual's information based on the subscriber's access groups. The presence detection engine 150 may detect a change in the individual's situation, as described further hereinafter, or the individual may communicate the change to the presence server 24 directly, as described previously, for example, via the voice-interface provided by the voice gateway 12.

Thus, with reference to the example mentioned previously, when the presence server 24 detects that the individual is at work, the presence server 24 transmits the individual's updated P&A information to the clients 142 for the individual's boss and spouse. The information that the boss and spouse receive, however, may be different based on their access levels, as discussed previously. For example, the boss may be informed of the individual's instant messaging information, but the individual's wife may not. When the individual returns home, the wife's information may be updated and the individual's parent may begin receiving information regarding the individual's P&A (although it may not be the same as the wife's information depending on their access levels). The boss, however, will no longer have access to the individual's information.

An individual may define his profile set, including his rules and preferences, via a user-interface in communication with the presence server 24. According to one embodiment, the user-interface may comprise a graphical user interface (GUI) application loaded on a computer device in communication with the presence server 24. Once defined, the presence server 24 may store the profiles, rules and preferences in a database 26. For security purposes, access to an individual's profiles etc. may be based on verification of a user PIN, password or other security mechanism. Accordingly, an individual may modify his profile settings as necessary.

In the previous example, a change in the individual's physical location triggered situation changes, and thus a change of profile. It should be noted that other factors may trigger changes in the individual's profile including, for example, time of day and the individual's mood, as explained further hereinbelow.

Figure 12:
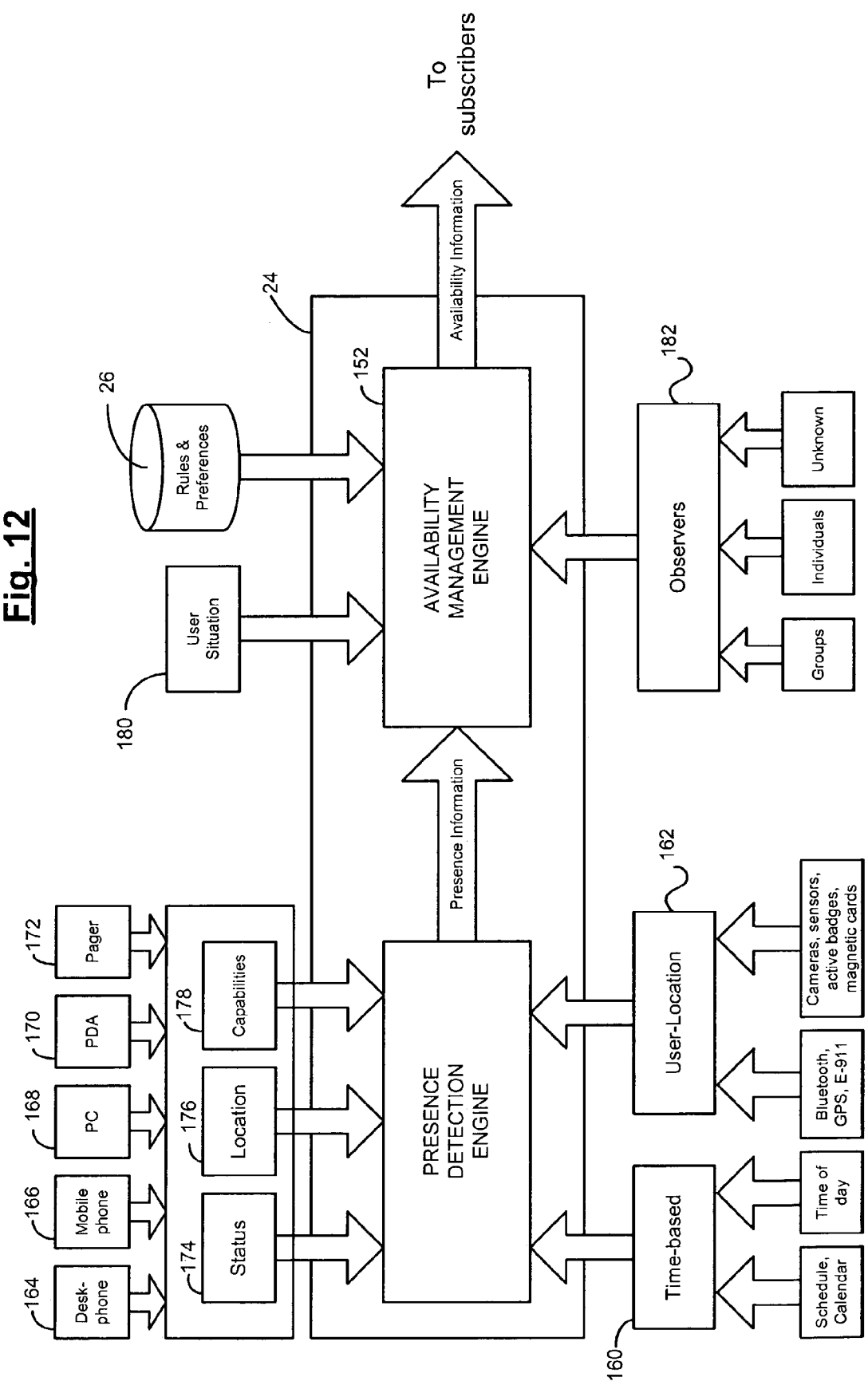
FIG. 12 is a diagram of the presence server according to one embodiment of the present invention.

FIG. 12 is a diagram of the presence server 24 according to one embodiment of the present invention. As illustrated in FIG. 12, the presence server 24 includes a presence detection engine 150 and an availability management engine 152. The presence detection engine 150 may determine an individual's presence upon particular networks based on various inputs, as described further hereinbelow. The presence detection engine 150 may transmit the presence information to the availability management engine 152, which in turn may determine the individual's availability based on the presence information as well as additional information, such as the individual's situation and defined rules and preferences. The determined availability information may then be transmitted to subscribers of the individual's availability information via, for example, the network 142 or the voice-interface provided by the voice gateway 12, as described previously.

The engines 150, 152 may be implemented as software code to be executed by a processor in the presence server 24 using any suitable computer language such as, for example, Java, C++ or Perl using, for example, conventional or object-oriented techniques. The software code may be stored as a series of instructions or commands on a computer readable medium, such as a random access memory (RAM), a read only memory (ROM), a magnetic medium such as a hard-drive or a floppy disk, or an optical medium such as a CD-ROM.

As illustrated in FIG. 12, the presence detection engine 150 may receive various inputs to determine, to the extent possible, the individual's presence. One type of input that the presence detection engine 150 may use to help determine the individual's presence is time-based input 160. For example, based on time of day information and known scheduling/calendar information, the presence detection engine 150 may be able to determine an individual's presence. For example, if the individual had scheduled to be in his office from 9 am to 5 pm, the presence detection engine 150 may determine that during that time period the individual is present on the networks available to him in his office, which may be, for example, telephone and instant messaging.

Another type of input that the presence detection engine 150 may use is user-location input 162. User-location information may be supplied, for example, from a number of possible networks or devices in communication with the presence server 24. For example, the presence server 24 may include a radio receiver (not shown) such that the presence detection engine 150 is in communication with radio networks including, for example, a Bluetooth network, that may communicate information relating to the individual's physical locale. In addition, the presence server 24 may be in communication with a GPS receiver associated with the user. According to another embodiment, the presence detection engine 150 may be in communication with Enhanced 911 (E-911) networks for possible user-location information.

In addition, the presence detection engine 150 may receive input from various hardware devices that may relate information regarding user location. For example, the presence detection engine 150 may receive information from cameras, such as security cameras located at a place of employment. Thus, the camera information may relate information as to whether the individual is in the locale of his place of employment. Additionally, the presence detection engine 150 may receive input from sensors, such as pressure sensors, to help ascertain the locus of the individual. The pressure sensors may be, for example, located in the office chair or the computer keyboard of the individual, thus providing information regarding the individual's locus. Furthermore, the presence detection engine 150 may receive inputs from security equipment, such as active badge sensors, smart card sensors and/or magnetic card readers to help ascertain the location of the individual.

Additionally, the presence detection engine 150 may be in communication with other networks/devices to help determine presence information. For example, the presence detection engine 150 may be in communication with a SS7 network of the public switched telephone network (PSTN) to determine if the individual is present on a landline telephone such as, for example, the landline desk phone 164 in his office. For example, the presence detection engine 150 may be in communication with a service control point (SCP) of the SS7 network. According to another embodiment, the presence detection engine 150 may receive inputs from a Home Location Register (HLR) of a wireless telephone network to determine if the individual is present on his mobile phone 166. The wireless telephone network may be, for example, an AMPS (Advanced Mobile Phone Service) network, a TACS (Total Access Communication System) network, a UMTS (Universal Mobile Telecommunications System), a GSM network, a CDMA network, a TDMA network, a GPRS (General Packet Radio Service) network or a wireless CDPD (Cellular Digital Packet Data) network. According to other embodiments, the presence detection engine 150 may also or instead of be in communication with a short messaging system center (SMS-C) of a short messaging system network or a gateway GPRS support node (GGSN). According to another embodiment, the presence detection engine 150 may be in communication with a server of a computer network.

The presence detection engine 150 may also receive inputs from computer networks such as, for example, a local Ethernet, a LAN, a wireless LAN, a MAN, a WAN, or a TCP/IP network, to determine if the individual is present on such a network, such as via his personal computer (PC) 168. Similarly, the presence detection engine 150 may be in communication with communication networks to determine whether an individual is present on other devices such as, for example, a personal digital assistant (PDA) 170 or a pager 172.

Based on the presence information on such devices 164–172, the presence detection engine 150 may determine additional information about the individual, such as the individual's status 174 on particular networks (such as on or off) or the individual's physical location 176. In addition, based on information regarding each of these devices 164–172 the presence detection engine 150 may determine the individual's current capabilities 178 such as, for example, whether he can receive voice information, data files, audio files, video files, etc.

The presence information ascertained by the presence detection engine 150 is communicated to the availability management engine 152, which determines the individual's availability based thereon. To determine the individual's availability, the availability management engine 152 may receive information transmitted by the individual regarding a change in their situation 180. Such a change in user situation may be communicated to the availability management engine 152 through a communication network such as, for example, an IP network, a telephone network, or a radio network.

The availability management engine 152 may consult the individual's rules and preferences to determine the individual's availability based on, for example, the presence information from the presence detection engine 150 and the individual's situation. The individual's rules and preferences may be stored in the database 26. Additionally, the individual may specify the observers 182 who receive the individual's contact information. The observers may be specified according to, for example, a group basis or an individual basis. The observer classification information may also be stored in the database 26.

The availability information may then be published to the individual's subscribers at, for example, the client terminals 142 and/or telephone devices 8, 9 via the voice gateway 12. Because the availability information is determined, in part, based on the presence information from the presence detection engine 150, the availability management engine 152 may modify the published contact information sent to subscribers based on the presence information if, for example, the individual's profile is inconsistent with the actual individual's presence. Thus, availability management engine 152 may be configured to take the presence information into account and cease from relaying the inconsistent contact information to subscribers.

Figure 13:
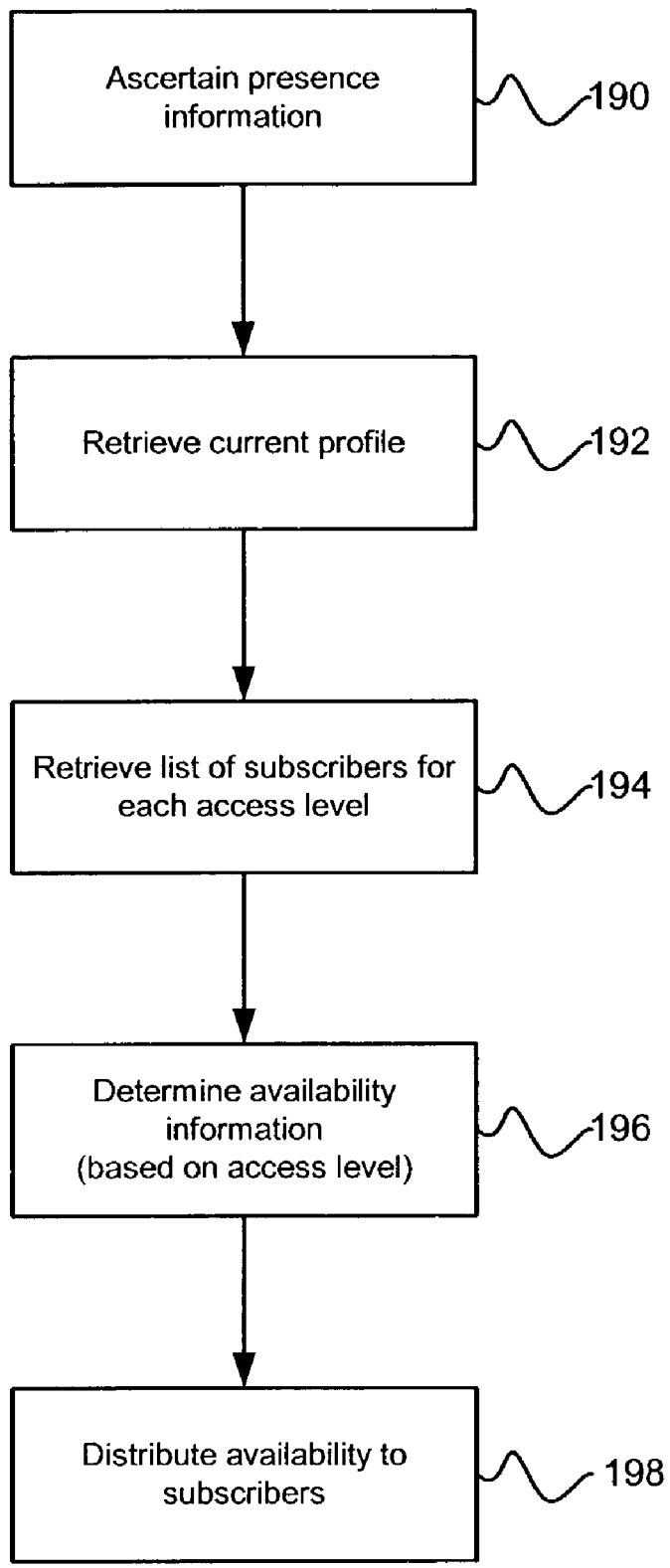
FIG. 13 is a diagram illustrating a process flow through the presence server of FIG. 12 according to one embodiment of the present invention.

FIG. 13 is a diagram of the process flow of the presence server 24 according to one embodiment. The process initiates at block 190 where the presence detection engine 150 ascertains presence information regarding the user as described previously. At block 192, the user's current profile is retrieved from the profile database 26 based on the current user situation. At block 194, the list of observers for each access level (e.g., important, normal, restricted, work, blocked, etc.) for the current profile is retrieved.

At block 196, the availability management engine 152 may determine the user's availability for each access level based on the user's profile. At block 198 the availability information is distributed (published) to the subscribers of the information on a per access level basis.

According to another embodiment, the availability management engine 152 may first retrieve the appropriate profile based on the individual's situation. The individual's presence and availability information may then be filtered before it is published to the observers. FIG. 14 is a diagram of the presence server 24 according to such an embodiment. The illustrated embodiment includes an adaptive feedback module 200, which may be implemented, for example, as software code to be executed by a processor of the server 24 using any suitable computer language such as, for example, Java, C++ or Perl using, for example, conventional or object-oriented techniques. The software code may be stored as a series of instructions or commands on a computer readable medium, such as a random access memory (RAM), a read only memory (ROM), a magnetic medium such as a hard-drive or a floppy disk, or an optical medium such as a CD-ROM.

The adaptive feedback module 200 may monitor the published availability information and, if the information is, for example, inaccurate or unusable, make adjustments to either the presence detection engine 150 or the availability management engine 152 to ensure the integrity of the published availability information. For example, if the published availability information for an individual indicates that he is available on his mobile telephone, but if the last three times someone called the individual on his mobile telephone the individual did not answer, then the adaptive feedback module 200 may instruct the presence detection engine 150 of this condition such that the published availability information for the individual will no longer indicate mobile telephone availability to the appropriate access levels until there is evidence that the individual resumes usage of his mobile telephone. The adaptive feedback module 200 may determine whether the individual's availability information is, for example, inaccurate or unusable based on information received from the appropriate communication networks with which the presence server 24 interfaces, as described previously.

According to one embodiment, the adaptive feedback module 200 may offer the individual a suggestion that the individual has the option of choosing to accept or reject. For example, if the adaptive feedback module 200 determines that the individual has not answered his last three telephone calls although he is present on a telephone network, the adaptive feedback module 200 may send the individual a message asking whether he wants to discontinue publishing whether he is available on the telephone network. In this way, the individual has the ability to tune his presence and availability information.

Figure 14:
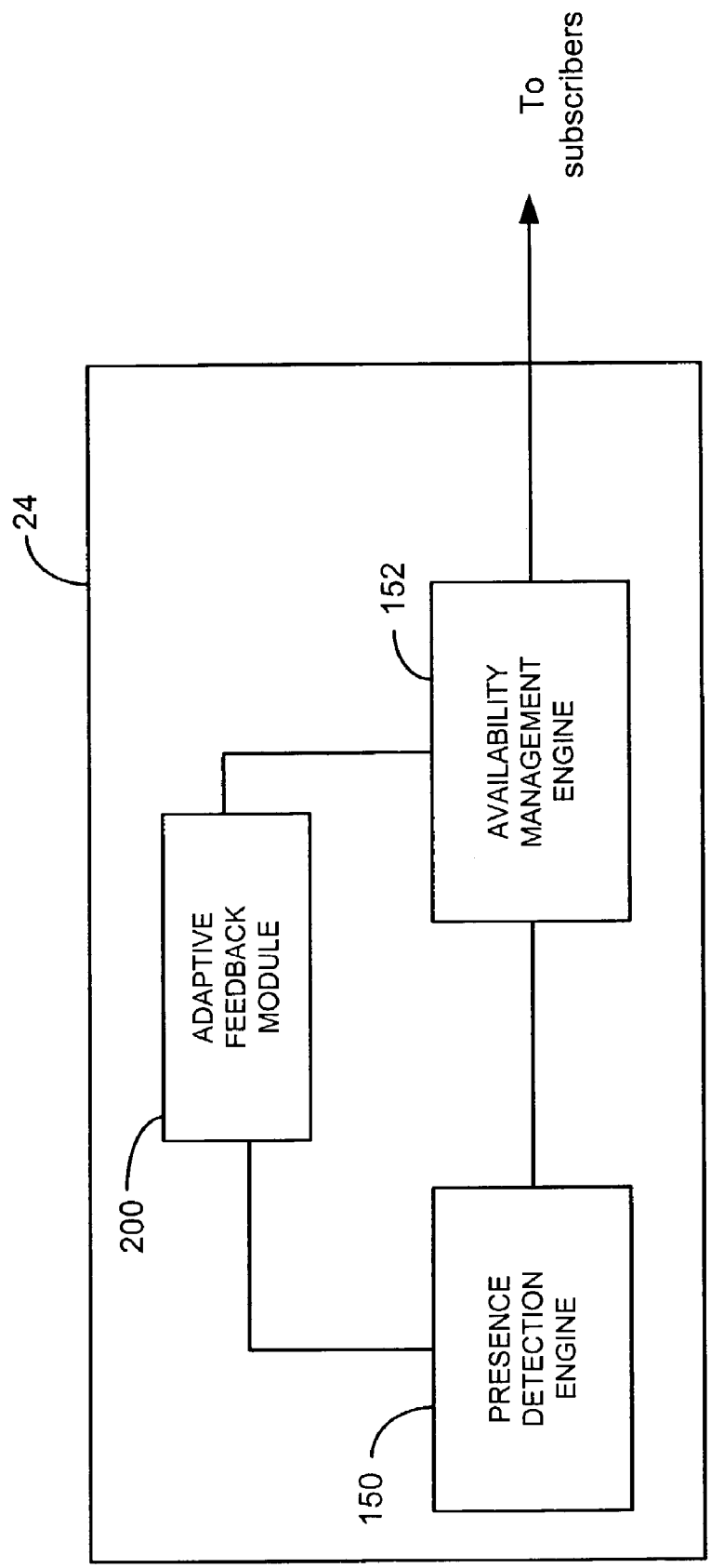
FIG. 14 is a diagram of the presence server according to another embodiment of the present invention.
Figure 15:
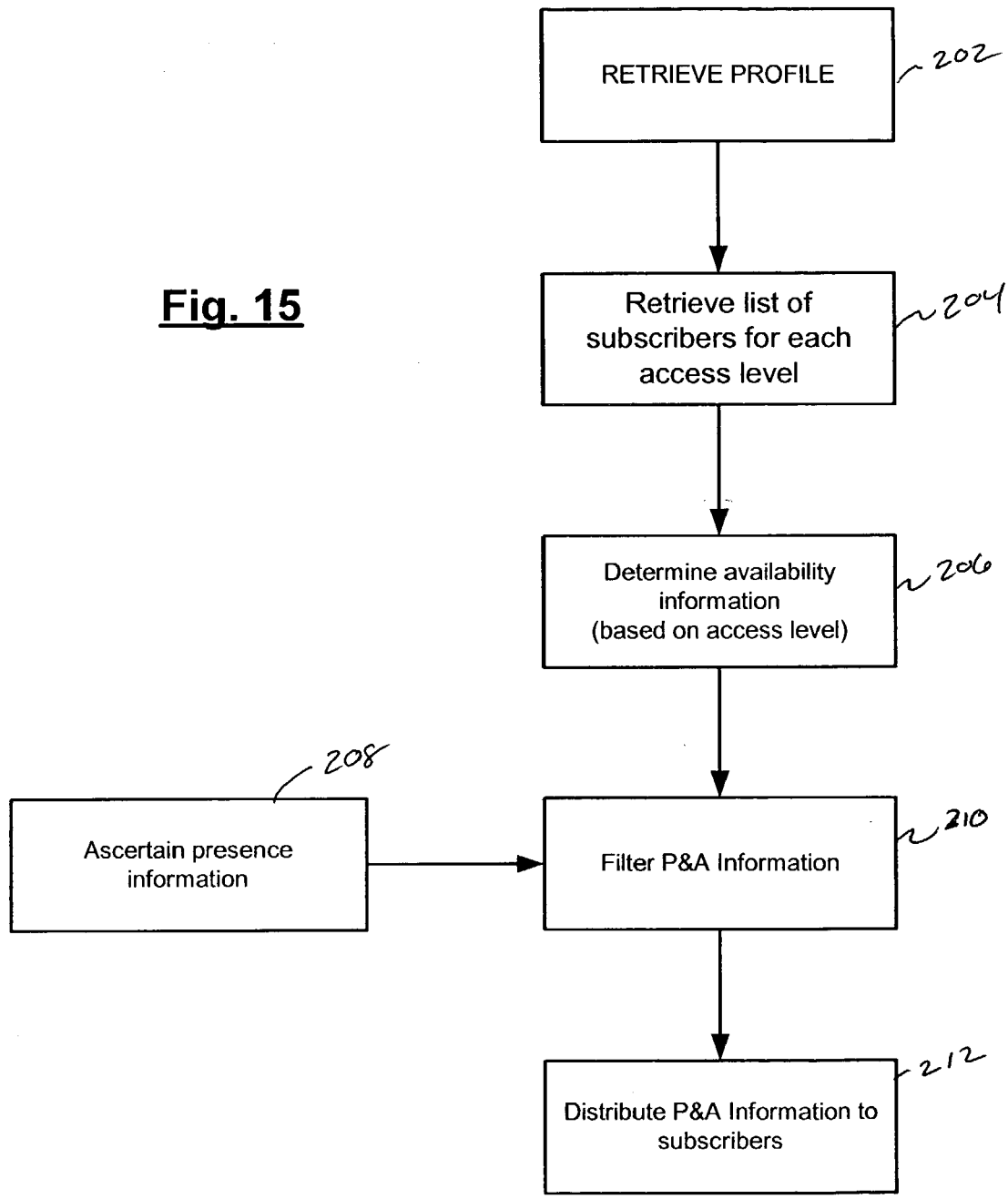
FIG. 15 is a diagram illustrating a process flow through the presence server of FIG. 14 according to one embodiment of the present invention.

FIG. 15 is a diagram of the process flow through the presence server 24 of FIG. 14 according to such an embodiment. The process initiates at block 202, where the availability management engine 152 retrieves the individual's profile based on the individual's present situation, as discussed previously. At block 204, the availability management engine 152 may retrieve the user-specified list of subscribers for each access level of the profile. Next, at block 206, based on the user's profile, the availability management engine 152 may determine the availability of the user for each access level.

At block 208, the presence detection engine 150 may ascertain the individual's presence on each of the monitored networks, as discussed previously. Based on this information, at block 210, the adaptive feedback module 100 may filter the individual's P&A information, as discussed previously. Next, at block 212, the presence server 24 may publish the information to each of the subscribers.

The term "calling party" or "caller" is used herein generally to refer to the person or unit that initiates a telecommunication. In some cases, the calling party may not be a person, but may be a device such as a facsimile machine, an answering service, a modem, etc. The term "communication" is used herein to include all messages or calls that may be exchanged between a calling party and a called party, including voice, data and video messages. The term "communication" is used synonymously herein with the term "call" unless a distinction is noted. The term "recipient" refers to an intended recipient of a communication and may be, for example, an individual, an entity, an organization, an enterprise, a firm, etc.

Figure 16:
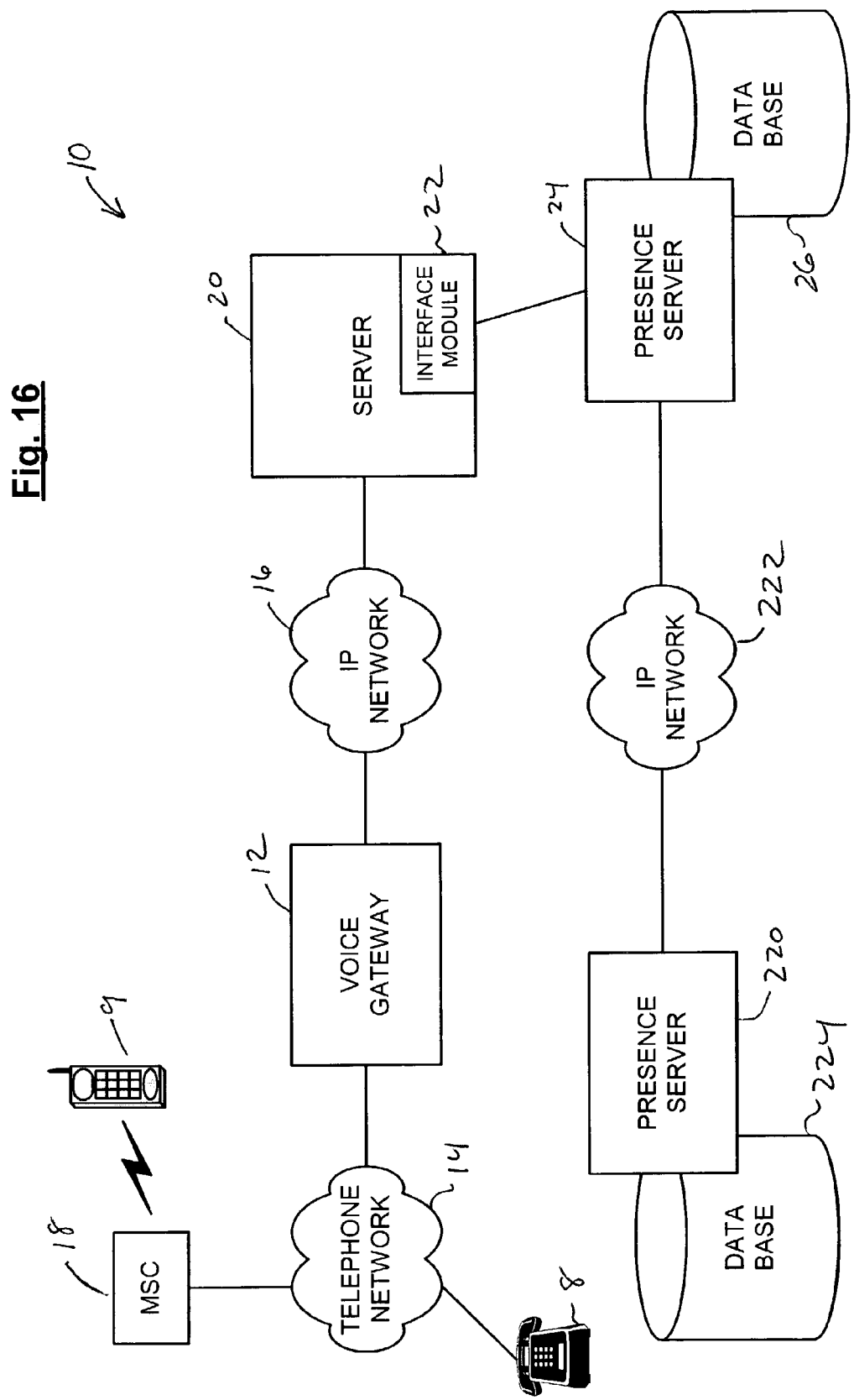
FIG. 16 is a diagram of the system according to another embodiment of the present invention.

In a distributed environment, it may be the case that the presence server associated with the caller's administrative entity does not control the determination of the presence (or presence and availability) of the individual (i.e., recipient) about whom the caller seeks information. In that case, according to one embodiment, the presence server of the caller's administrative entity may communicate with the presence server of the recipient's administrative entity in order to communicate the presence information of the recipient to the caller. FIG. 16 is a diagram of the system 10 according to one such embodiment. As illustrated in FIG. 16, the presence server 24 may be in communication with the presence server 220 via a communication network, such as an IP network 222. The presence server 220 may be similar to the presence server 24 and include an associated database 224, as described previously, for storing presence profiles.

According to such an embodiment, the caller may call the voice gateway 12 associated with the caller's presence server 24 to obtain the recipient's presence information. The presence server 24, because it may not be the presence server of the administrative entity associated with the recipient, may not store the recipient's profile, access levels, situations, etc. in the database 26. Instead, the presence server 24 may store the address of the presence server 220 associated with the recipient. Thus, when the presence server 24 receives the communication from the voice gateway 12, the presence server 24 may communicate with the recipient's presence server 220. The presence server 220 may store in the database 224 the recipient's profile, access levels, situations, etc. and, based thereon, determine the presence information that the caller can access. The presence server 220 may release this information to the presence server 24, which may communicate it to the caller via the voice gateway 12, as described previously. Thus, the presence server 24 in this case may act as an intermediate presence server.

Although the present invention has been described herein with respect to certain embodiments, those of ordinary skill in the art will recognize that many modifications and variations of the present invention may be implemented. For example, the one or more of the voice gateway 12, server 20, and presence servers 24 and 220 may be colocated. The foregoing description and the following claims are intended to cover all such modifications and variations.

What is claimed is:

1. A system for providing voice-activated presence information, comprising: a voice gateway in communication with a presence server, wherein the voice gateway is configured to receive a voice input from a user, the voice input representing an identification of a desired recipient of a communication, wherein the presence server is configured, in response to the voice input, to determine if the desired recipient is present on a communication network, and if the desired recipient is present, to determine if the desired recipient is available to receive the communication, the presence server including a presence detection engine for detecting whether the desired recipient is present on the communication network and an availability management engine in communication with the presence detection engine for determining whether the desired recipient is available on the communication network, wherein the availability management engine is configured to determine whether the desired recipient is available for communication with the user on the communication network based on access data in a profile of the desired recipient.

2. The system of claim 1, wherein the presence server includes a database for storing a plurality of profiles for the desired recipient, each profile corresponding to a different situation of the desired recipient, and wherein the availability management engine is configured to retrieve one of the plurality of profiles to determine the desired recipient's availability based on at least one of an input regarding the situation of the desired recipient and an input regarding a location of the desired recipient.

3. The system of claim 2, wherein the presence server is configured to determine whether the desired recipient is present and available on a telephone network and the voice gateway is configured to place an outgoing telephone communication to the desired recipient.

4. The system of claim 1, further comprising a server, wherein the voice gateway is in communication with the presence server via the server.

5. The system of claim 4, wherein the server is an HTTP server including a Common Gateway Interface (CGI) module.

6. The system of claim 1, wherein the voice gateway is further configured to record a voice message from the user for the desired recipient, convert the voice message to a text file and deliver the text file to the desired recipient via the communication network when the presence server determines that the recipient is present and available on the communication network.

7. The system of claim 6, wherein the communication network includes a Short Messaging System network.

8. The system of claim 1, wherein the voice gateway is configured to record a voice message from the user for the desired recipient and deliver an attachment containing the voice message to the desired recipient via the communication network when the presence server determines that the desired recipient is present and available on the communication network.

9. The system of claim 8, wherein the communication network includes one of an Instant Messaging network and an electronic mail network.

10. The system of claim 1, wherein the presence server is configured to provide contact information regarding the desired recipient to the voice gateway upon receiving a request from the voice gateway and the voice gateway is configured to voice the contact information to the user after being provided the contact information from the presence server.

11. The system of claim 10, wherein the voice gateway is configured to placing an outgoing communication to the desired recipient upon receiving a request from the user in response to voicing the contact information to the user.

12. The system of claim 1, wherein the voice gateway is configured to receiving a request from the desired recipient to change a presence characteristic of the desired recipient.

13. The system of claim 12, wherein the presence characteristic includes a situation of the desired recipient.

14. A method for enabling communication between a user and an intended recipient of a communication, comprising:

receiving a voice input from the user, the voice input identifying the intended recipient;

in response to the voice input, accessing contact information for the intended recipient;

determining if the intended recipient is present on a communication network associated with the contact information and if the intended recipient is present, determining if the intended recipient is available to receive the communication; and placing an outgoing communication to the intended recipient when it is determined that the intended recipient is present and available on the communication network, wherein the method further comprises, voicing the contact information to the user, and placing the outgoing communication to the intended recipient upon receiving a voice request from the user in response to voicing the contact information, and further, wherein voicing the contact information includes voicing only the contact information to which the user is entitled based on an access level of the user.

15. A system for providing voice-activated presence information, comprising:

means for receiving a voice request from a caller to communicate with a recipient;

means for determining if the recipient is present, and if the recipient is present, determining if the recipient is available in response to receiving the voice request;

means for placing an outgoing communication to the recipient when it is determined that the recipient is present and available on at least one communication network;

means for receiving a voice request from the caller for contact information regarding the recipient;

means for determining the recipient's contact information; and means for voicing the contact information to the caller, wherein the means for determining the recipient's contact information includes means for determining only the contact information to which the caller is entitled based on an access level of the caller.

16. A method for enabling communication between a user and an intended recipient of a communication, comprising:

receiving a voice input from the user identifying the intended recipient;

accessing contact information associated with the intended recipient, the contact information including information corresponding to one or more communication methods;

determining that the intended recipient is present on a communication channel corresponding to one of the communication methods;

determining that the intended recipient is available for communication with the user on the communication channel; and voicing the contact information for the communication channel to the user.

17. The method of claim 16, wherein the contact information includes access control data, the access control data determining whether the intended recipient desires that the user have access to the contact information.

18. The method of claim 16, further comprising:

receiving a voice input from the user in response to the user receiving the contact information, the voice input including a request to provide a message to the intended recipient; and providing the message to the intended recipient.

19. The method of claim 18, wherein the message is a voice message.

20. The method of claim 19, wherein the voice message is provided as an attachment to another message.

21. The method of claim 18, wherein the message is a text message, the text message obtained by converting a voice input provided by the user.

* * * * *